United States Patent [19]

Blahut et al.

[11] Patent Number: 4,999,808
[45] Date of Patent: Mar. 12, 1991

[54] DUAL BYTE ORDER DATA PROCESSOR

[75] Inventors: Donald E. Blahut, Holmdel; Brian W. Colbry, Frenchtown, both of N.J.; Thomas D. Lovett, Portland, Oreg.; Peter V. LaMaster, Edison, N.J.

[73] Assignee: AT&T Bell Laboratories, Murray Hill, N.J.

[21] Appl. No.: 420,631

[22] Filed: Oct. 5, 1989

Related U.S. Application Data

[63] Continuation of Ser. No. 913,545, Sep. 26, 1986, abandoned, which is a continuation-in-part of Ser. No. 433,449, Oct. 8, 1982, abandoned.

[51] Int. Cl.⁵ .................................................. G06F 7/24
[52] U.S. Cl. ..................................... 364/900; 364/960; 364/960.4; 364/960.5; 364/715.08; 341/55
[58] Field of Search ... 364/200 MS File, 900 MS File, 364/715.01, 715.03, 715.08; 341/55, 50, 89, 93; 370/83, 99, 77, 112

[56] References Cited

U.S. PATENT DOCUMENTS

| | | | |
|---|---|---|---|
| 3,374,466 | 3/1968 | Hanf et al. | 364/200 |
| 3,553,652 | 1/1971 | Hanson | 340/172.5 |
| 3,812,467 | 5/1974 | Batcher | 340/172.5 |
| 3,862,406 | 1/1975 | Brooks | 235/152 |
| 3,988,601 | 10/1976 | Perry | 235/92 SH |
| 3,996,566 | 12/1976 | Moran | 364/200 |
| 4,126,897 | 11/1978 | Copowski et al. | 364/200 |
| 4,181,976 | 1/1980 | Collins et al. | 364/900 |
| 4,301,505 | 11/1981 | Catiller et al. | 364/200 |
| 4,306,289 | 12/1981 | Lumley | 364/200 |
| 4,321,665 | 3/1982 | Shen et al. | 364/200 |
| 4,396,994 | 8/1983 | Kang et al. | 364/900 |
| 4,407,016 | 9/1983 | Bayliss et al. | 364/200 |
| 4,438,493 | 3/1984 | Cushing et al. | 364/200 |
| 4,447,878 | 5/1984 | Kinnie et al. | 364/200 |
| 4,467,444 | 8/1984 | Harmon, Jr. et al. | 364/900 |
| 4,495,598 | 1/1985 | Vahlstrom et al. | 364/900 |

*Primary Examiner*—Eddie P. Chan
*Assistant Examiner*—Kevin A. Kriess
*Attorney, Agent, or Firm*—D. I. Caplan

[57] ABSTRACT

In order that a microprocessor can respond properly to both instruction words and data words that are organized in off-chip memory in accordance with either of two byte order conventions, on-chip circuitry is added which controllably changes the byte order of both the instructions and the data to that of the microprocessor.

3 Claims, 4 Drawing Sheets

FETCH UNIT

X - DON'T CARE

✱✱ - SIGN EXTENSION FROM BIT 15 TO FILL WORD

✱✱✱ - SIGN EXTENSION FROM BIT 7 TO FILL WORD

DUAL BYTE ORDER DATA PROCESSOR

This application is a continuation of application Ser. No. 913,545, filed on Sept. 26, 1986 which was a continuation of Ser. No. 433,449, filed Oct. 8, 1982, now abandoned.

FIELD OF THE INVENTION

This invention relates to data processing systems and, more particularly, to a data processing system operative in response to instructions having different byte orders.

BACKGROUND OF THE INVENTION

We will adopt the convention that a byte comprises eight bits of data and thus, a 16-bit word comprises two bytes while a 32-bit word comprises four bytes. The order of the bytes is significant in data processing because the processor is organized so that bits in prescribed positions cause prescribed actions which a user is powerless to alter.

There are two well-known communIties of users; the IBM (International Business Machine CorPoration) and the DEC (Digital Equipment Corporation) communities. These two communities are well entrenched and interpret information in accordance with different byte order conventions. Processors which are organized to respond to instructions of one byte order do not respond properly to instructions of the other byte order. Consequently, at present, users operating with one byte order are foreclosed from using processors organized for the other byte order. Moreover, two separate software support efforts must be maintained at great expense.

BRIEF DESCRIPTION OF THE INVENTION

The foregoing problem is resolved by adding to a data processing system a circuit arrangement which identifies Whether a first or second byte order is being used. The selection is responsive to a user-initiated signal representative of the selection made and is operative to tell the processor that the user is using the byte order for which the machine is organized or that the user is using the opposite byte order.

In one embodiment, a microprocessor including an instruction queue and a read only memory (ROM) is provided With a multiplexer at the input to the queue. The output of the ROM is also connected to the input to the multiplexer. The input to the multiplexer is also connected to the address and data (A/D) BUS along which instructions and data from external memory move. The multiplexer is operative in response to a user-generated signal to interchange the first and fourth bytes and the second and third bytes of a four-byte (32-bit) instruction.

A data processor including means for controllably changing the byte order of an instruction is believed to be a departure from prior art thinking as is the placement of a multiplexer at the input of a queue to change that byte order upon command.

DETAILED DESCRIPTION

Figure 1:
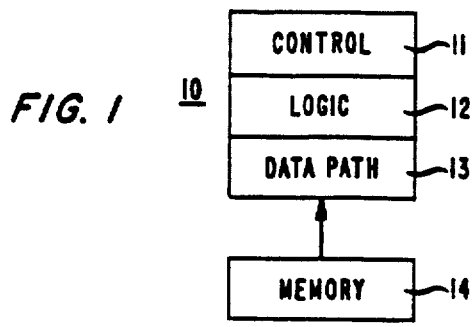
FIG. 1 is a schematic representation of the functional organization of a microprocessor chip and memory.

FIG. 1 shows a schematic representation of the functional organization of a semiconductor microprocessor chip 10. The chip includes several functional areas represented as control, logic and data path areas 11, 12 and 13, respectively, and is operated typically with data stored in an external memory 14.

Figure 2:
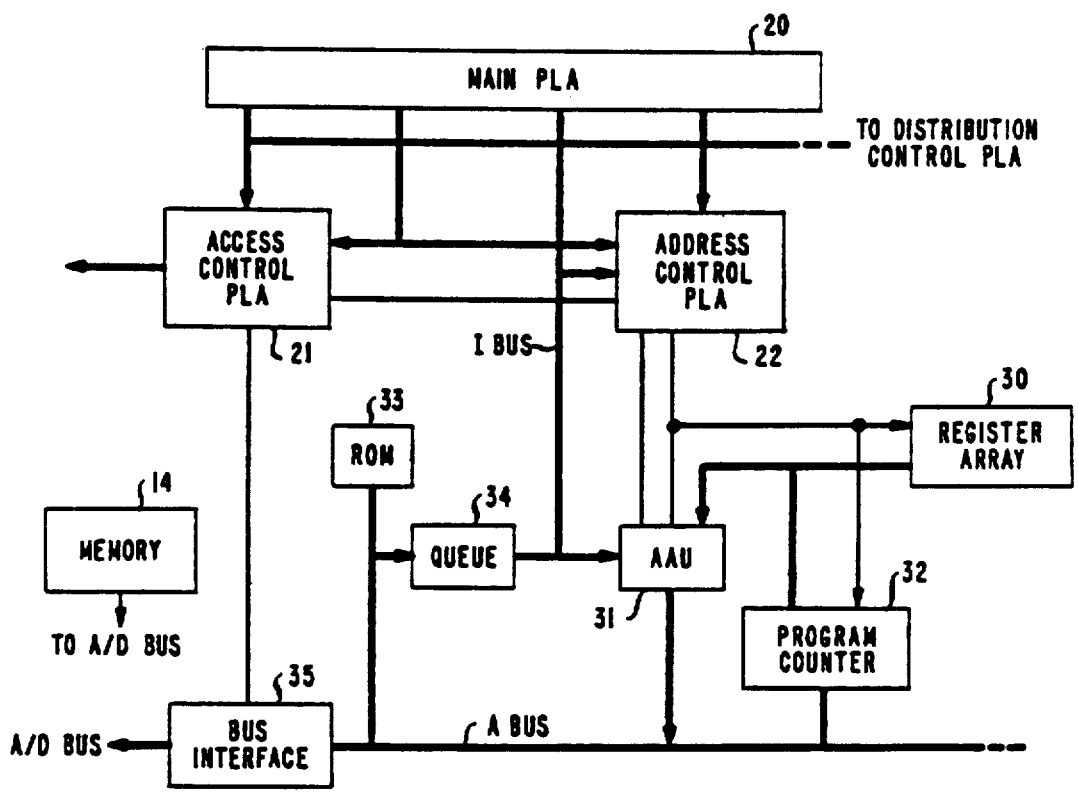
FIGS. 2 and 4 are schematic block diagrams of the fetch and execute portions of the chip of FIG. 1.
Figure 4:
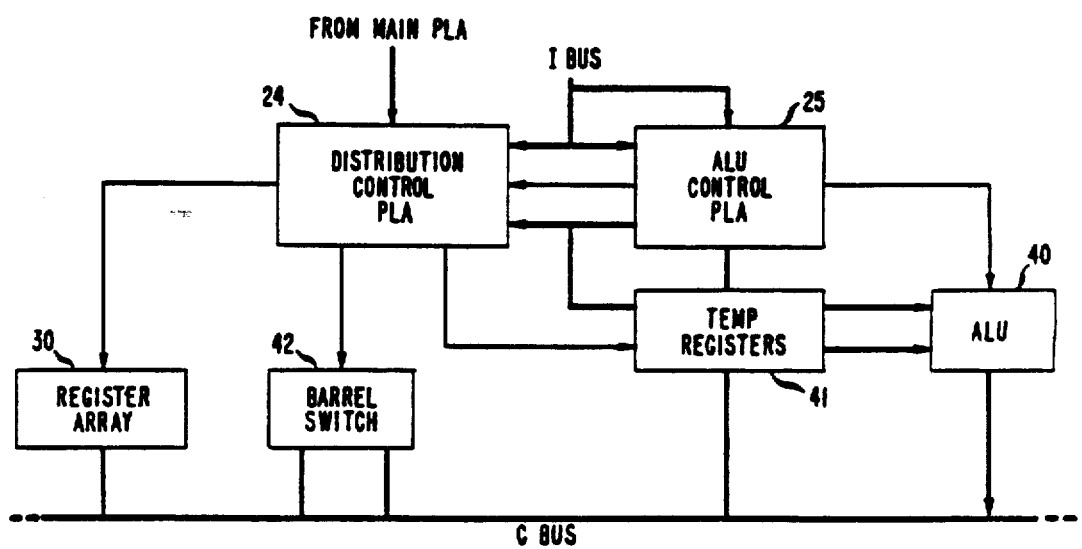

The control area in the illustrative embodiment comprises a plurality of programmable logic arrays (PLA's) interconnected and operated in a manner disclosed in copending application Ser. No. 233,107 filed Feb. 10, 1981 for D. E. Blahut, M. L. Harrison, M. J. Killian and M. E. Thierbach; and Ser. No. 415,732 filed Sept. 7, 1982 for A. D. Berenbaum, A. Jagannathan, J. J. Molinelli and S. P. Pekarich. The PLA's are represented as blocks in FIGS. 2 and 4 and are designated by function. FIG. 2 shows blocks 20, 21 and 22 designated MAIN, ACCESS CONTROL. and ADDRESS CONTROL. respectively. FIG. 4 shows blocks 24 and 25 designated DISTRIBUTION CONTROL PLA and ALU (arithmetic logic unit) PLA, respectively.

The data path includes a number of functional elements also represented by blocks in FIGS. 2 and 4. FIG. 2, for example, shows user register array 30, an address arithmetic unit (AAU) 31, a program counter (PC) 32, a ROM 33 and a queue 34. The elements are connected to an Address/Data Instruction A-BUS which interfaces Via a BUS interface 35 to an external address and data BUS (A/D BUS) as shown in FIG. 2 and described in the last mentioned copending application. FIG. 4 shows register array 30 (of FIG. 2), along with arithmetic logic unit (ALU) 40, temporary registers 41 and barrel switch 42. The elements of the data path in FIG. 4 are connected to the C-BUS as shown in the Figure and are also described in the last-mentioned copendinq application. Barrel switch 42 is disclosed in copendinq application Ser. No. 221,777 filed Dec. 31, 1980 for S. M. Kang and R. H. Krambeck.

The various decoding/interconnection BUS and associated logic circuitry (not shown) comprise the logic portion of FIG. 1.

The portion of the microprocessor shown in FIG. 2 is operative as the data and instruction fetch unit, the various elements operating generally in a well-understood manner except for the cooperation of the various PLA's disclosed in the first-mentioned patent application above. Generally, PLA's 21 and 22 of FIG. 2 control the movement of instructions (opcode) and data from memory. Data is moved to (user) register array 30 or to other destinations on chip; opcodes are moved to queue 34. Program counter 32 increments to point to the next memory address and AAU 31, which contains an adder, controls more complex address changes as is well understood. Instructions may be moved from ROM 33 to queue 34 under the control of MAIN PLA 20.

The portion of the microprocessor shown in FIG. 4 is referred to as the execute unit. Data from external memory 14 are routed selectively to register array 30 or other destinations via the A-BUS and the usual A- and C-BUS multiplexer (not shown). Data may be routed through the barrel switch 42. The general interconnection and operation of the various elements in the fetch and execute units of the microprocessor are well understood in the art and are discussed herein only to the extent of providing a context for an understanding of the present invention.

The portion of the microprocessor shown in FIG. 2 is modified to include circuitry for changing the byte order of an instruction moved to the queue from memory or from ROM 33. The portion of the microprocessor shown in FIG. 4 is modified to include circuitry for controlling barrel switch 42 into shifting bytes of data in a manner consistent with the user-selected byte order.

Figure 3:
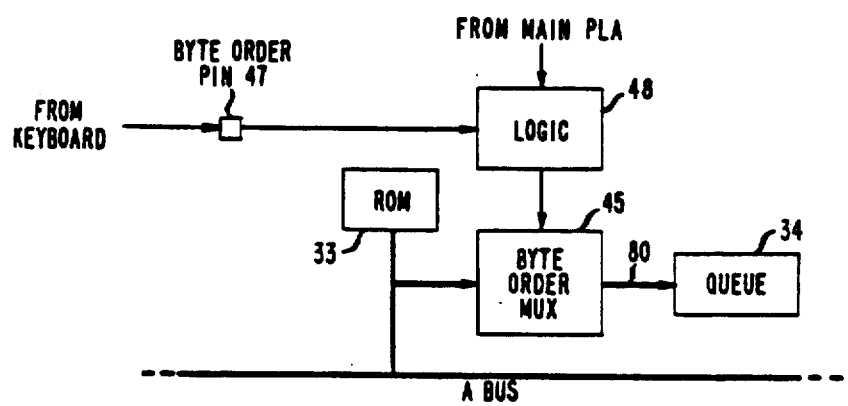
FIGS. 3, 6 and 7 are circuit diagrams of additions and modifications to the portions of the chip of FIG. 1 shown in FIGS. 2 and 4, respectively.

FIG. 3 shows a byte order multiplexer (MUX) 45 added to the circuit of FIG. 2 between the A-BUS and the input to queue 34. As can be seen from the Figure, MUX 45 is also connected between the output of ROM 33 and the input to queue 34. Any instruction from memory (on the A-BUS) or from ROM is applied to MUX 45 before being moved to the queue.

Figure 5:
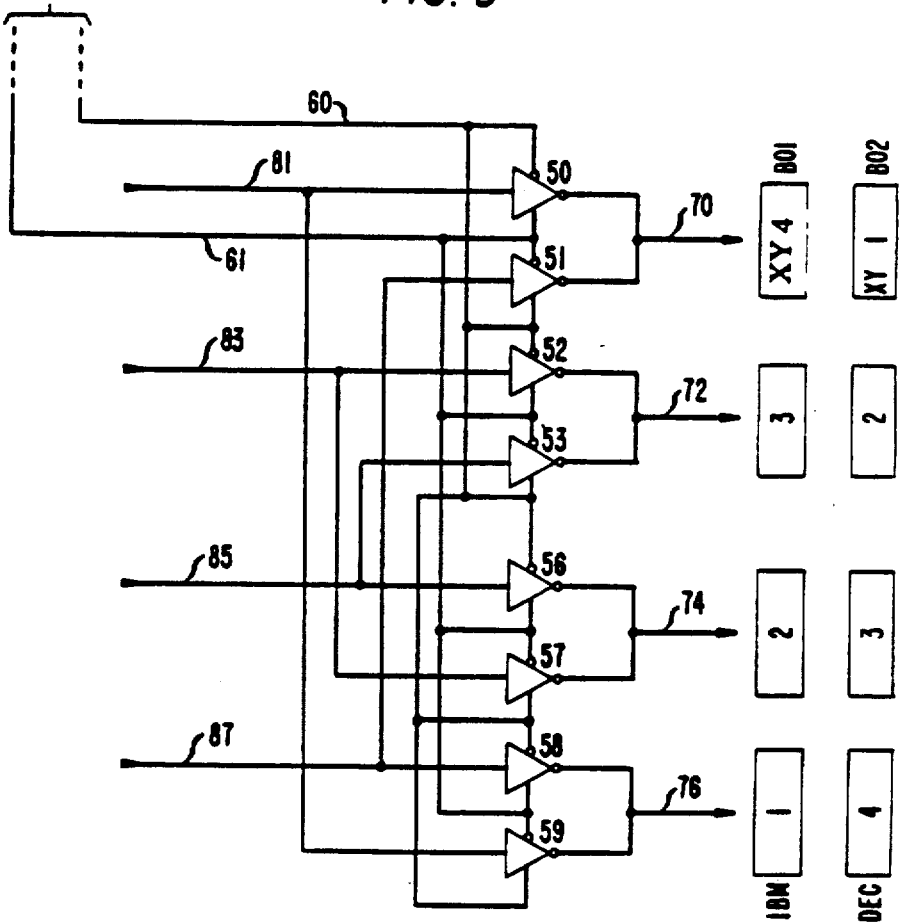
FIG. 5 is a detailed circuit diagram of a portion of the circuit diagram shown in FIG. 3.

MUX 45 is controlled by a signal applied to a byte-order pin 47, via logic circuit 48 for determinIng the byte order of the instruction FIG. 5 shows the details of MUX 45. The MUX includes sixty-four gated inverters represented as one inverter per byte, by inverters 50, 51, 52, 53, 56, 57, 58 and 59. Electrical control conductors 61 and 60 are connected to the gate inputs of inverters 50, 52, 56, and 58 and to the gate inputs of inverters 51, 53, 57 and 59, respectively. The (8-bit outputs) of inverters 50 and 51, 52 and 53, 56 and 57, 58 and 59 are connected to electrical output conductors 70, 72, 74 and 76, respectively. Conductors 70, 72, 74 and 76 together constitute a 32-bit BUS represented in FIG. 3 at 80. Eight-bit input lines 81, 83, 85 and 87 are shown connected to inputs to inverters 50 and 59. 52 and 57, 53 and 56 and 51 and 58, respectively.

The operation of MUX 45 depends on the signals applied to conductors 60 and 61. A word of four bytes, ABCD, applied to input lines 81, 83, 85 and 87, respectively, in the presence of a high signal level on line 61, passes through inverters 50, 52, 56 and 58 to provide outputs on lines 70, 72, 74 and 76 consistent with the byte order of the input word. On the other hand, if those input bytes are applied in the presence of a high signal level on (invert) conductor 60, inverters 51, 53, 57 and 59 are gated and provide outputs on lines 70, 72, 74 and 76 consistent with a reversed byte order DCBA. The two byte orders are designated B01 (IBM) and B02 (DEC) in FIG. 5. The bit order in each byte remains unchanged in the illustrative embodiment as indicated by the x and y notation in IBM byte 1 and DEC byte 4 of FIG. 5. The queue is operative entirely as in prior art processors because the byte order of instructions applied to it is now entirely consistent With the organization of the processor.

Figure 7:
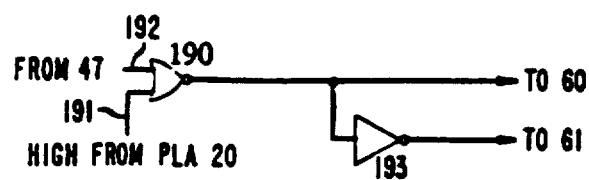

The control conductors of the circuit of FIG. 5 (MUX 45, FIG. 3) are connected to the output of logic circuit 48 of FIG. 3 and shown in detail in FIG. 7. Circuit 48 includes a NOR circuit 190 having two inputs to which lines 191 and 192 are connected. One input to circuit 48 (line 191) is connected to an output of PLA 20; another (line 192) is connected to byte-order pin 47. The output of circuit 190 is connected to conductor 60 of FIG. 5 and, via an inverter 193, to conductor 61 of FIG. 5. In the presence of a high output signal level from PLA 20 or from pin 47, or both, circuit 48 provides a high output control signal on conductor 61. In the presence of a low signal on both inputs of circuit 48, a high output on conductor 60 is provided.

The signal on line 191 of FIG. 7 originates at PLA 20 and indicates when an instruction is being fetched from ROM 33 of FIG. 2 (assumed to be in the IBM byte order). The MUX of FIG. 5, in this instance, is in a pass state with a low voltage on conductor 60 and a high voltage on conductor 61. If line 191 is low but line 192 (from pin 47) is high, conductor 60 is in a low voltage condition and again the MUX is in a pass state. If both lines 191 and 192 exhibit low voltage conditions, the byte order of information coming from external memory is reversed and conductor 60 is high while conductor 61 is low.

In addition to instruction byte order modification, it may be necessary to alter the order of bytes within data words fetched from memory. As is well understood in the art, the data path portion of a microprocessor is organized to extract entities of 8-bit bytes or 16-bit half-words from 32-bit words by shifting the position of the desired datum in a manner consistent with the selected byte order. Specifically, there exists a variety of operations which the data path can be called upon to perform by the user-generated program. The two byte-ordering conventions (IBM and DEC) affect the operation performed.

Consider a four byte word, ABCD, where each letter represents an 8-bit byte. We will adopt the convention that ABCD represents the byte order in an accessed word where A is the high-order byte and D is the low-order byte. One of the desirable data oath operations calls for a full word (four byte) access. In this case, the selected byte-ordering scheme (IBM or DEC) does not affect the machine operations. That is to say, the data ordering is the same in both cases and requires no modification.

Two other data path operations involve datum of less than a full thirty-two bits (a full word) and changes in operation do occur if less than a full word is to be operated upon. For memory read oPerations, the datum must be moved from the position that it occupies in the memory word to the position of the low order bits of the internal 32-bit BUS. For memory write operations, the datum must he moved from the low order bits of the internal BUS to the appropriate position on the external BUS. For example, for a half-word read, the full thirty-two bits are brought into barrel switch 42 and the sixteen bits of interest are shifted into the low order positions. The sixteen high-order positions are masked to "sign extend" the half-word to a full 32-bit Word.

The second case of less than full word operation occurs when a byte read is requested. That is to say, the program calls for only a single byte of information A, B, C or D. In this case, the selected byte is moved to the low-order position and then the masking operation is carried out.

The operation of the shifter is controlled by the program via PLA 24. Inputs (instructions) cause that PLA to direct the barrel switch to shift and mask the data according to the type of access being made: full word, half-word or byte. The last two bits in the address of the data indicate the desired part of the accessed word.

Figure 6:
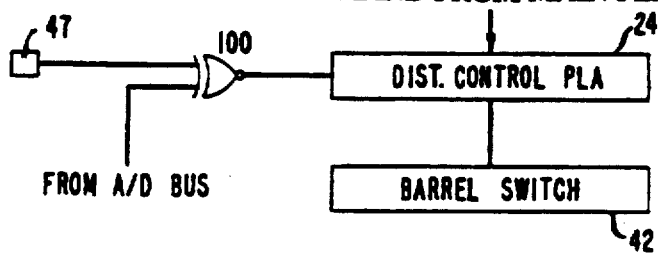
Figure 8:
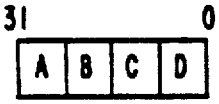
FIG. 8 is a table showing byte positions of data for dual byte order operation.

FIG. 8 shows the shift operation required for each possible combination of data type, word, half-word, byte and two low-order address bits, A∅ and A1. It is clear that the definitions of the two byte order conventions are such that the low order two bits of byte and half-word addresses are simple complemented relative to each other. With this in mind, the modifications necessary to switch a processor from one convention to the other, as far as the data path operation is concerned, consists simply of complementing the address bits before the barrel switch's controller interPrets them. FIG. 6 shows this modification. Circuit 100 comprises an exclusive OR gate operative to complement the address bits if byte-order pin 47 is low (DEC), but passes the bits unchanged if byte-order pin 47 carries a high (IBM) signal.

The illustrative embodiment presupposes a byte-organized instruction stream. If the stream is organized for half-words, (16 bits), the MUX 45 is adapted to interchange half-words rather than bytes. If the stream is organized on a word basis, no alteration of the instruction occurs.

What is claimed is:

1. A combination comprising
   (a) a data processor adapted for receiving and processing binary coded words each of which is organized into a plurality N of bytes, N being greater than 2 such bytes containing a multiplicity of bits, the processor designed for responding to and properly utilizing each of such words if and only if each of such words is organized in accordance with a first byte order convention being either a left-to-right or a right-to-left byte order convention but not if such words are organized in accordance with a second byte order convention which is in reverse from the first byte order convention;
   (b) memory means for storing binary coded words each of which has a like plurality N of bytes organized in accordance either with convention or with the second byte order convention;
   (c) transfer means for moving words from the memory means into the processor in response to signals from the processor;
   (d) byte order control means for changing in response to a byte-order control signal, from said second to said first byte order convention, simultaneously in a single operation the byte order of all the bytes in each such word being moved from the memory to the processor when the words stored in the memory means are organized in accordance with the second byte order convention.

2. The combination of claim 1 wherein said processor is a microprocessor integrated in a semiconductor chip and wherein said memory means comprises an off-chip memory, and wherein the binary coded words comprise both instruction words and data words, and wherein the byte order control means includes a first on-chip control means for selectively changing the byte order of the instruction words and a second on-chip control means for selectively changing the byte order of the data words, the second on-chip control means consisting essentially of exclusive OR or exclusive NOR logic means.

3. The combination of claim 2 in which N+4 and in which the byte order control means consists essentially of a pair of exclusive OR or exclusive NOR logic gates each adapted for receiving the byte-order control signal and a separate one of the two lowest order address bits used for selecting the four bytes of each data word.

* * * * *

UNITED STATES PATENT AND TRADEMARK OFFICE
CERTIFICATE OF CORRECTION

PATENT NO.   : 4,999,808
DATED        : March 12, 1991
INVENTOR(S)  : D.E. Blahut, B.W. Colbry, etal It is certified that error appears in the above-identified patent and that said Letters Patent is hereby corrected as shown below:

Column 6, line 1, "either with convention" should read
--either with the first byte order convention--.

Column 6, line 26, "N+4" should read --N=4--.

Signed and Sealed this

Eighth Day of December, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,999,808

DATED : March 12, 1991

INVENTOR(S) : Donald E. Blahut, Brian W. Colbry, Thomas D. Lovett, Peter V. LaMaster It is certified that error appears in the above-identified patent and that said Letters Patent is hereby corrected as shown below:

Column 6, line 26, "N + 4" should read --N = 4--.

Signed and Sealed this

Seventh Day of December, 1993

Attest:

BRUCE LEHMAN

Attesting Officer

Commissioner of Patents and Trademarks